UNITED STATES PATENT OFFICE.

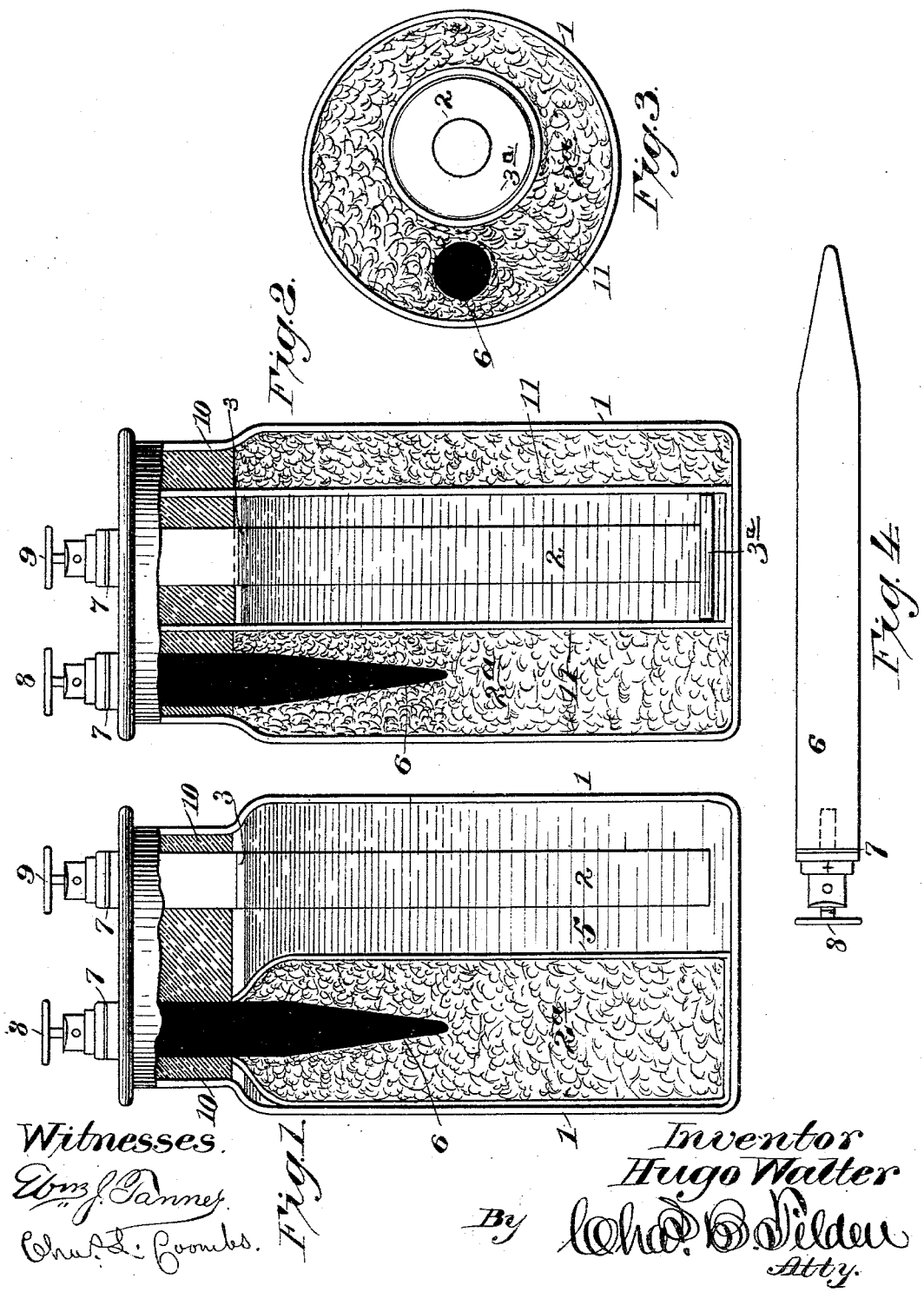

HUGO WALTER, OF CINCINNATI, OHIO, ASSIGNOR TO THE NATIONAL GALVANIC BATTERY COMPANY, OF NEW YORK.

GALVANIC BATTERY.

SPECIFICATION forming part of Letters Patent No. 378,121, dated February 21, 1888.

Application filed September 20, 1886. Serial No. 214,098. (No model.)

*To all whom it may concern:*

Be it known that I, HUGO WALTER, of Cincinnati, county of Hamilton, and State of Ohio, have invented a new and useful Improvement in the Construction of Galvanic Batteries, of which the following is a specification.

The object of my invention is to construct a battery for open-circuit work which shall be compact in form, permanently and hermetically closed or sealed, and perfectly portable, and which, by the enormous surface of depolarizing material, will be capable of doing more work than batteries of the kind heretofore used.

The invention consists in the several novel features of construction and new combinations of parts hereinafter fully described, and definitely pointed out in the claims following this specification.

Referring to the accompanying drawings, Figure 1 is a central vertical section of a battery embodying my invention. Fig. 2 is a similar view of a battery, showing a slightly-modified construction. Fig. 3 is a horizontal section of Fig. 2. Fig. 4 is a detail view of the solid carbon of the electrode.

In the said drawings the reference-numeral 1 designates the battery-cell, which consists of a wide-mouthed receptacle, of glass or other suitable material. Within this cell I place the positive electrode, which consists of a bar of zinc, 2, wrapped with some absorbing material, 3, such as blotting-paper, asbestus cloth, or other substance. The purpose of this wrapping is simply to prevent the zinc from coming into contact with the negative electrode, and it may therefore not extend over the whole surface of the positive electrode, as a short collar, 3ª, as in Fig. 3, will be sufficient for the purpose.

For the negative electrode, I take carbon in a crushed or broken form, similar to that used in facing-mills for reduction into facing-powder. This crushed or granular carbon may be packed into a common canvas bag, 5, of such size as to permit the zinc electrode to stand in the cell without contact and long enough to reach from end to end of the cell, or nearly so, as in Fig. 1. After packing the bag more than half-full of the granular carbon, I introduce a solid stick of carbon, 6, and then completely fill the bag with the crushed carbon, packing the same closely around and against the solid carbon 6, which projects through the mouth of the bag. When filled, the mouth of the bag is drawn closely around the solid piece of carbon and secured in any suitable manner. This piece of carbon is used to lead the current out, and I employ for this purpose a piece of carbon point as they are manufactured for arc lamps, though any other form might be employed.

Upon the top of the carbon rod 6, I apply a plating, 7, and drill a hole therein, into which I insert the screw-leg of a binding-post, 8, which is then soldered to the plated top 7. A binding-post, 9, is soldered into the top of the positive electrode 2, and the soldered parts are then treated with a good coat of asphaltum varnish to prevent their oxidation. The positive and negative electrodes being now placed in the cell, as shown in Fig. 1, the exciting-liquid is poured in until the cell is filled to its capacity, and the receptacle is then permanently and hermetically closed by a seal, 10, of melted wax or paraffine poured in the mouth of the cell and around the projecting poles. The battery is now ready for use, and the owner has merely the conducting-wires to the binding-post.

I may substitute for the arrangement described that shown in Figs. 2 and 3, wherein the crushed carbon 2ª is packed in an annular receptacle, 11, which is concentric with the cell. In this case the current is led out by a piece of solid carbon around which the crushed carbon is packed, as described, and the positive electrode is placed in the middle of the cell. In all other respects the construction is unchanged.

Although the granular carbon is composed of small pieces, yet its irregularity of form not only permits the circulation of the liquid entirely through its mass, even when packed firmly together to insure good contact, but it furnishes an enormous surface of depolarizing material. I thus obtain a current of far greater strength and duration than has heretofore been obtained from a cell of the kind. When the liquid is salt and water, the battery will give a powerful current, and when filled with a solution of sal-ammoniac the current is very strong and lasting.

Having thus described my invention, what I claim as new, and desire to secure by Letters Patent, is—

1. A battery for open-circuit work, consisting of a permanently hermetically sealed or closed cell containing a negative electrode composed of crushed or granular carbon packed around and in contact with the solid carbon by which the current is lead out, and a positive electrode composed of zinc having a protective wrapping of absorbent material, substantially as specified.

2. A battery composed of a wide-mouthed jar, a negative electrode consisting of crushed or granular carbon confined and closely packed within an annular space in the cell, said space being formed by a cylindrical bag of fabric and by the wall of the jar, a piece of solid carbon around which the granular carbon is packed and by which the current is led out, a positive electrode arranged within the said cylindrical bag and provided with a collar at its lower end, an energizing solution, and a permanent seal closing the cell, substantially as specified.

3. In a battery, a negative electrode consisting of crushed carbon having a piece of solid carbon packed therein and arranged within an interior annular space formed by an inner bag or sack of fabric and by the wall of the cell, and a positive electrode arranged within said cylindrical sack, and provided with a collar upon its lower end, which rests upon the bottom thereof, substantially as specified.

HUGO WALTER.

Witnesses:
  S. FEIERTAG,
  BEN. V. TYLER.